United States Patent [19]

Olson

[11] 4,360,315

[45] Nov. 23, 1982

[54] VORTEX WIND TURBINE

[76] Inventor: Leonard Olson, 925 Tenderfoot Hill Rd., Apt. 216, Colorado Springs, Colo. 80906

[21] Appl. No.: 139,800

[22] Filed: Apr. 14, 1980

[51] Int. Cl.³ .............................................. F03D 7/04
[52] U.S. Cl. ...................................... 416/41; 416/44; 416/132 B
[58] Field of Search ............ 416/132 B, 135 A, 138 R, 416/139 A, 41, 137, 136, 44 A, 50 A, 51 A

[56] References Cited

U.S. PATENT DOCUMENTS

| 50,705 | 10/1865 | Hansen | 416/136 |
|---|---|---|---|
| 191,168 | 5/1877 | Nesbitt | 416/138 |
| 279,194 | 6/1883 | Sickles | 416/133 |
| 361,709 | 4/1887 | McMaster | 416/139 A X |
| 542,305 | 7/1895 | Fuller | 416/139 A |
| 675,301 | 5/1901 | Scheubeck | 416/133 |
| 683,593 | 10/1901 | Clough | 416/139 A |
| 726,376 | 4/1903 | Tompkins | 416/137 |
| 741,515 | 10/1903 | Lowe | 416/138 |
| 857,376 | 6/1907 | Axelstrom | 416/137 |
| 1,178,729 | 4/1916 | Kemble | 416/133 |

FOREIGN PATENT DOCUMENTS

| 805388 | 5/1951 | Fed. Rep. of Germany | 416/44 A |
|---|---|---|---|
| 1058863 | 3/1954 | France | 416/132 B |
| 2413566 | 8/1979 | France | 416/132 B |
| 57405 | 5/1946 | Netherlands | 416/136 |

Primary Examiner—Everette A. Powell, Jr.
Attorney, Agent, or Firm—Richard W. Hanes

[57] ABSTRACT

The present invention relates to wind turbines and more particularly to such a device having a horizontally disposed power output shaft pivotally supported by a turntable. Attached to the output shaft are a number of circumferentially spaced apart blades which are each hinged along their leading edges with the hinge axes inclined obliquely to the longitudinal axis of the shaft. A spring controlled governor is provided to control the pivotal position of each of the blades around their respective hinge axis of rotation.

2 Claims, 6 Drawing Figures

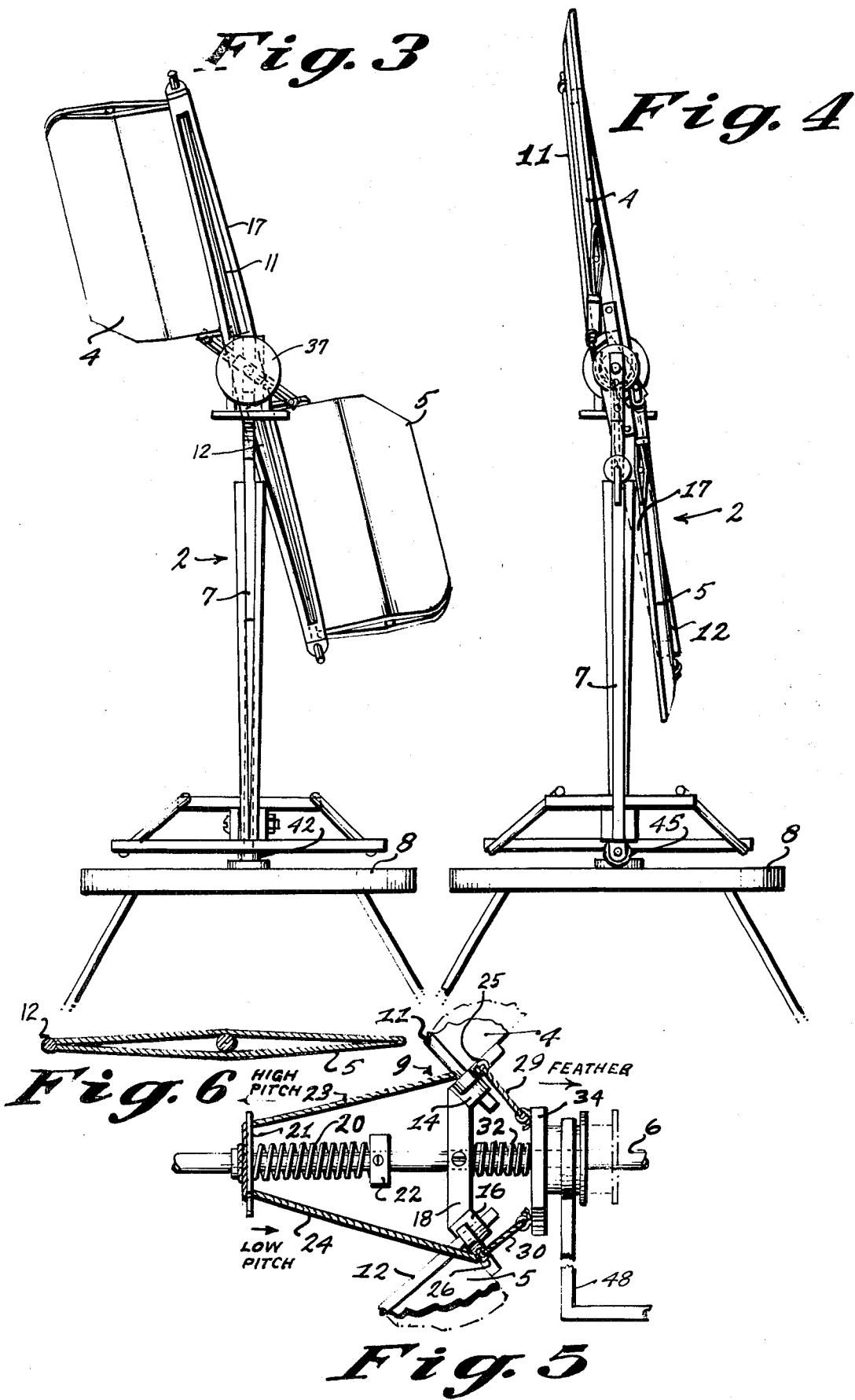

VORTEX WIND TURBINE

BACKGROUND OF THE INVENTION

The most familiar windmills are simply propeller blades mounted on a horizontal axis with a mechanism for keeping the blades turned into the wind. To utilize ordinary windmills for effective power generation, it has become apparent that the blades must be large, some having dimensions as large as 200 feet. These giant propellers have problems that seem to increase dramatically as the size increases—the longer they are, the more they tend to shake themselves to pieces. Even vertical axis windmills, like the Savonius rotor and the Darrieus turbine, may not be adaptable for large scale use. Severe aeroelastic problems are encountered in large scale devices. Because of these disadvantages inherent in common propeller blades, efforts have been made to augment the air flow through a windmill device in order to permit reduction in the blade size. An article describing various proposed designs for augmenter windmills is found on page 72 of the September 1978 edition of "Popular Science" magazine, published by Times Mirror Magazines, Inc.

It is the primary object of the present invention to provide a wind turbine which will get more air from the propeller than would be the case with ambient wind velocities.

Another object of the invention is to provide a vortex augmenter which will operate without the risk of additional static structures to create the vortex, such as an airfoil.

A further object of the invention is to provide a windmill which, by its inherent conception and design, will keep itself turned into the wind without the need for additional fins or other devices.

A still further object of the invention is to provide a power generating wind turbine whose blade size and total cost is substantially less than ordinary propeller bladed windmills with equivalent power generating capacity.

Other features and objects of the invention will become apparent from a reading of the following description of a preferred form of the invention taken in connection with the drawings.

DESCRIPTION OF THE DRAWINGS

FIG. 3 is a front view of the vortex wind turbine of the present invention.

FIG. 4 is a rear view with the blades shown in feathered position.

FIG. 5 is a fragmentary enlarged view of the pitch governor and blade feathering control.

FIG. 6 is a cross sectional view of one of the blades taken along lines 6—6 of FIG. 1.

DESCRIPTION

Figure 1:
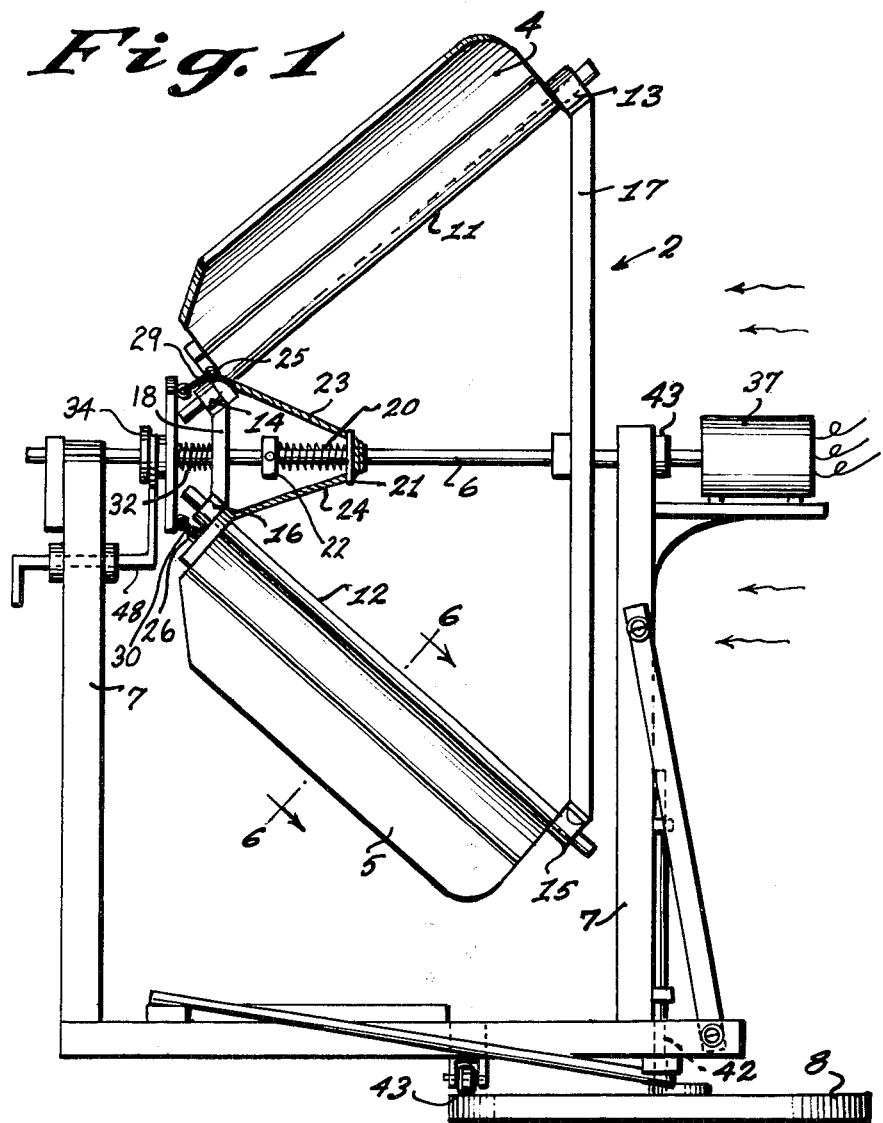
FIG. 1 is a side view of the vortex wind turbine of the present invention.
Figure 2:
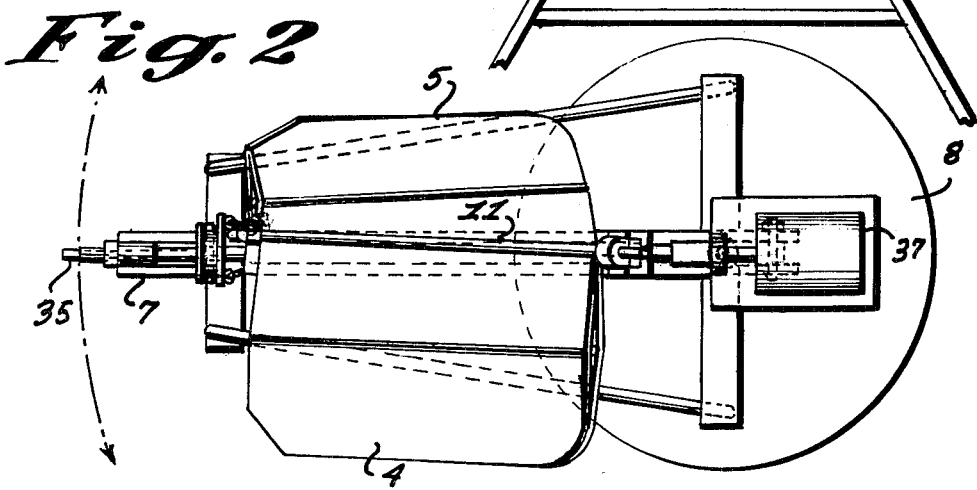
FIG. 2 is a top view of the vortex wind turbine of the present invention.

A wind turbine according to the present invention is shown and generally referred to in the drawings by reference numeral 2. The turbine comprises a pair of airfoil blades 4 and 5 mounted for rotation on a horizontal shaft 6 carried by a supporting structure 7 which is pivotally mounted on a platform 8. The pitch angle of the blades is controlled as a function of wind velocity by a governor 9.

The whirling circular motion of the air is created by the novel positioning of the blades 4 and 5. As seen best in FIG. 1, the blades are leaned back into the wind at about a 45° angle. As the blades rotate about their primary axis of rotation, shaft 6, the air surrounding shaft 6 is fanned into a circular motion, creating a vortex. The central cavity or low pressure center of the vortex acts to draw in additional air and augment the flow through the blades 4 and 5. The increase in air flow through the propeller blades increases their efficiency and permits the designed size of the blades to be smaller than for equivalent power developing windmills. Prototype experiments have shown that, size for size, the turbine of the present invention develops approximately four times the power of conventional windmills of similar size.

To further describe the construction of a preferred form of the windmill, reference is again made to the drawings where it is seen that the airfoil shaped blades are each mounted on slender shafts 11 and 12, respectively, which are journalled for rotation in bearings 13 and 14, and 15 and 16. The front bearings 13 and 15 for each blade are carried by a support bar 17 which is carried by, and rotates with, the shaft 6. Similarly, the rear bearings 14 and 16 are carried by a support bar 18 rigidly fastened to the shaft 6. Secondary pivotal movement of the blades 4 and 5 about their individual mounting shafts 11 and 12 enable the blades to assume different pitch angles with respect to the angle of the air flow. Pitch changes in the blades 4 and 5 are a function of the wind velocity, providing efficient operation of the turbine for varying wind conditions.

In no wind or light wind conditions, the blades are pitched so as to be substantially similar to the angle shown in FIG. 3. As the wind velocity increases and higher air pressure is present across the blades, it is desirous for the blades 4 and 5 to assume a lower pitch angle, approaching the position shown in FIG. 4.

A pitch governor, generally referred to by reference numberal 9, is provided to control the pitch angle of the blades as a function of wind velocity. Very generally speaking, the blades are positioned for a no-wind condition by the balancing of the forces of a pair of springs. The blade angle is allowed to change through the force of the wind pressure acting against the force of one of those springs. More specifically, the governor 9 comprises a helical spring member 20 coaxially carried by the shaft 6 and which spring member urges a yoke 21, slidingly carried by the shaft 6, forward and apart from a spring stop member 22, rigidly secured to the shaft 6. A pair of cables 23 and 24 interconnect the radially remote ends of the yoke 21 and fasteners 25 and 26 respectively.

The fasteners or eyes 25 and 26 are attached to the blades 4 and 5 at a distance from their respective mounting shafts 11 and 12 sufficient to provide a force moment about the shafts 11 and 12 so as to pivot the blades about their shafts and increase their pitch angles when tension is applied in the cables 23 and 24.

To establish a stable no-wind position for the blades and to provide the necessary balancing bias, a second spring 32 is also mounted on the main shaft 6 and is arranged to exert pressure between the fixed support bar 18 and a sliding collar 34. A pair of secondary cables 29 and 30 interconnect the radial extremities of the collar 34 and the fastener eyes 25 and 26 and because of the pressure exerted on the collar 34 by the spring 32 the cables 29 and 30 exert a force on the blades 4 and 5 which is substantially opposite in direction to the force exerted by the cables 23 and 24. At the point where the forces in the two pairs of cables are equal, the pitch angle of the blades will stabilize. Wind pressure on the blades will unbalance forces, allowing the second spring 32 to move the collar 34 further outwardly on the shaft 6, causing the cables 29 and 30 to pivot the blades 4 and 5 and decrease their respective pitch angles. As the wind velocity decreases and greater pitch angle is desired, the biasing force of the main control spring 20 causes the cables 23 and 24 to pull the blades back into the greater pitch angle against the tension of cables 29 and 30 and the pressure of spring 32.

In conditions of extremely high wind velocities where damage might result to the turbine, a rearward manual pull of a feathering yoke 48 operably engaged with the shaft collar 34 will cause the tension in the feathering cables 29 and 30 to pull the blades 4 and 5 into an angle of zero pitch, or feathered, so that they will not rotate about the main shaft 6 (see FIG. 4).

To obtain useful power output from the turbine, a generator 37 is directly coupled to the shaft 6.

In order that the turbine blades will always face into the wind the main power shaft 6 is journalled in a support structure which is pivotally attached to the primary mounting platform 8. Any well known pivot device such as a rod or axle 42, may be used to pivotally mount the support structure 7. The pivot point is selected under the rear main shaft bearing 43, thus permitting the weather vaning wind forces which are acting on the blades 4 and 5 to also act to pivot the support structure and orient the blades directly into the wind. A small wheel 45 movably supports the cantelevered portion of the support structure 8.

I claim:

1. A wind turbine comprising:

a rotatable horizontally disposed power output shaft;

turn-table means pivotally supporting the shaft around a vertical axis;

a plurality of circumferentially spaced apart blades having leading and trailing edges and a longitudinal center line;

hinge means having an axis of rotation and attached to the leading edge of each of said blades and carried by the power shaft for rotation therewith and wherein the longitudinal center lines of the blades are oblique to the longitudinal axis of the said shaft and radial with respect to the axis of rotation of the shaft generating a cone-shaped surface on rotation;

governor means for controlling the pivotal position of the blades around the axis of rotation of the hinge means including:

a pair of springs carried by said shaft and arranged to be disposed for exerting coaxial and opposite forces; and movable connecting means bearing against each of said springs and connected to the blades for pivoting the blades about the axis of rotation of the hinge means responsive to the forces exerted by the said springs.

2. The combination of claim 1 and further including:

lever means operably attached to one of said connecting means for providing force assistance to one of said springs so as to feather the blades.

* * * * *